United States Patent [19]

Takamiya et al.

[11] Patent Number: 4,712,450
[45] Date of Patent: Dec. 15, 1987

[54] STEPLESS SPEED CHANGE DEVICE

[75] Inventors: Kikuzo Takamiya, Kitamoto; Hideyuki Ishibashi; Kunitoshi Kozakae, both of Ageo, all of Japan

[73] Assignee: Bridgestone Cycle Co., Ltd., Tokyo, Japan

[21] Appl. No.: 825,734

[22] Filed: Feb. 3, 1986

[30] Foreign Application Priority Data

Feb. 9, 1985 [JP] Japan .................................. 60-22748
Feb. 14, 1985 [JP] Japan .................................. 60-25280
Apr. 16, 1985 [JP] Japan .................................. 60-79348

[51] Int. Cl.$^4$ ............................................. F16H 3/44
[52] U.S. Cl. ..................................... 74/750 B; 74/63; 74/211
[58] Field of Search ................... 74/63, 190, 199, 211, 74/750 B, 793, 804, 805

[56] References Cited

U.S. PATENT DOCUMENTS

| | | |
|---|---|---|
| 778,147 | 12/1904 | Ritscher . |
| 1,211,911 | 1/1917 | Boyd . |
| 2,166,565 | 7/1939 | Broluska . |
| 3,722,305 | 3/1973 | Walters et al. ................... 74/63 X |
| 3,868,860 | 3/1975 | Ishimi ................................. 74/63 |
| 3,874,253 | 4/1975 | Waddington . |
| 4,098,147 | 7/1978 | Waddington . |
| 4,181,043 | 1/1980 | Waddington . |
| 4,277,986 | 7/1981 | Waddington . |
| 4,283,969 | 8/1981 | Lapeyre . |
| 4,299,581 | 11/1981 | Korosue . |
| 4,376,394 | 3/1983 | Lapeyre . |
| 4,425,824 | 1/1984 | Koch . |
| 4,505,163 | 3/1985 | Falkner ............................... 74/63 |

FOREIGN PATENT DOCUMENTS

| | | |
|---|---|---|
| 2205322 | 8/1972 | Fed. Rep. of Germany . |
| 2317061 | 10/1973 | Fed. Rep. of Germany . |
| 1083075 | 1/1955 | France . |
| 341722 | 3/1959 | Japan . |
| 54-93754 | 7/1979 | Japan . |
| 8200961 | 10/1983 | Netherlands . |
| 412050 | 6/1934 | United Kingdom . |

Primary Examiner—David H. Corbin
Attorney, Agent, or Firm—Parkhurst & Oliff

[57] ABSTRACT

A stepless speed change device comprises first ratchet rings arranged in plural rows side by side in an axial direction on an inner circumferential surface of a rotary member on an input side through one-way clutches interposed therebetween, and an eccentric cam assembly arranged on a center shaft. An eccentricity of the cam assembly is adjustable relative to the center shaft. The device further comprises first pawls in plural rows to engage ratchets provided in the ratchet rings and having bottoms pivotally connected to a carrier rotatably provided on the eccentric cam assembly. The bottoms of the pawls in one row are between the bottoms of the pawls in the other row. The device comprises second ratchet rings arranged in plural rows side by side in the axial direction on an inner circumferential surface of an annular portion formed integrally with the carrier through one-way clutches interposed therebetween, second pawls in plural rows to engage second ratchets provided in the second ratchet rings and having bottoms pivotally connected to a rotary member on an output side. The bottoms of the further pawls in one row are between said bottoms of the further pawls in the other row.

11 Claims, 18 Drawing Figures

FIG_2

FIG_3

FIG_8

FIG_10

FIG_11

FIG_12

FIG_14

FIG_16
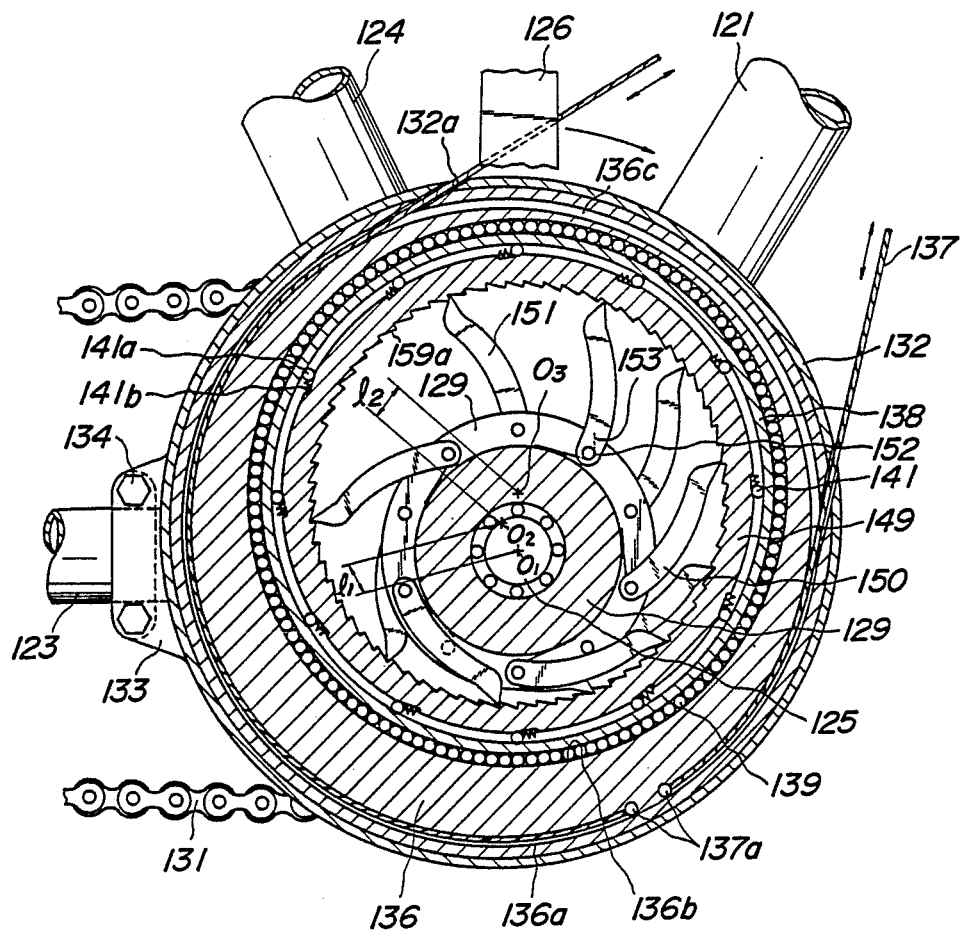

FIG_17
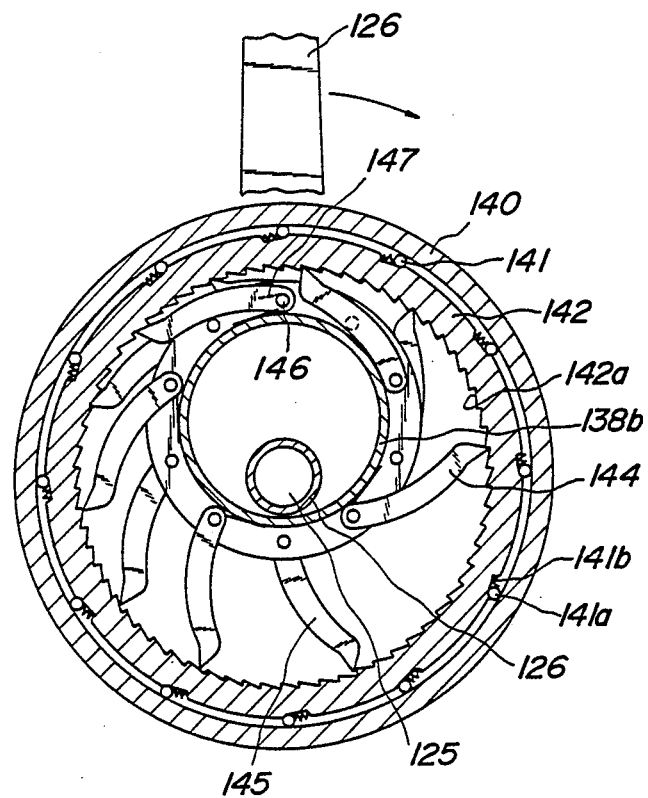

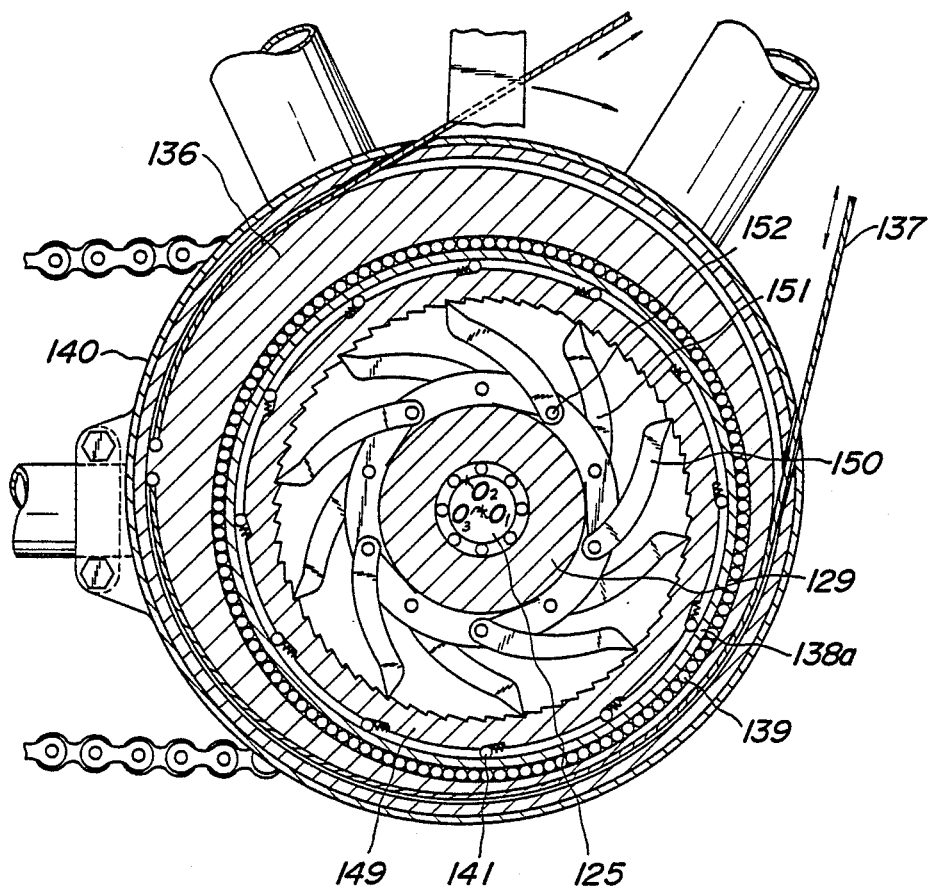
FIG_18

STEPLESS SPEED CHANGE DEVICE

BACKGROUND OF THE INVENTION

This invention relates to a stepless speed change device capable of changing its transmission speed and particularly suitable for use in a bicycle.

Such a kind of speed change device has been proposed, for example, as disclosed in Japanese Patent Application Publication No. 1,722/59.

In the prior art, however, a driving mechanism by pawls is arranged only in a single row, so that the number of the pawls available is limited, with the result that a cyclist is afflicted with pulsations in transmission.

With the prior art, moreover, shocks in transmission occur when the pawls taking part in transmission are switched. This results from a fact that there is a gap between tooth ends of a driving ratchet and a driven pawl which are about to take part in transmission, owing to difference in speed between them.

SUMMARY OF THE INVENTION

It is a primary object of the invention to provide an improved stepless speed change device which eliminates all the disadvantages of the prior art, that is, greatly reduces the pulsations and shocks in transmission in speed-up driving.

In order to achieve this object, a stepless speed change device according to the invention comprises: first internally toothed ratchet rings arranged in plural rows side by side in an axial direction on an inner circumferential surface of a rotary member on an input side through one-way clutches interposed there between; an eccentric cam assembly arranged on a center shaft, an eccentricity of said cam assembly being adjustable relative to said center shaft; first pawls in plural rows to engage ratchets provided in said first ratchet rings and having bottoms pivotally connected to a carrier rotatably provided on said eccentric cam assembly, said bottoms of the pawls in one row being between said bottoms of the pawls in the other row second internally toothed ratchet rings arranged in plural rows side by side in the axial direction on an inner circumferential surface of an annular portion formed integrally with said carrier through one-way clutches interposed therebetween, second pawls in plural rows to engage ratchets provided in said second ratchet rings and having bottoms pivotally connected to a rotary member on an output side, said bottoms of the second pawls in one row being between said bottoms of the second pawls in the other row.

As above described according to the invention, the ratchet rings and the pawls are arranged in plural rows to considerably increase the number of the pawls in comparison with that of the single row, thereby greatly reducing the pulsations in transmission of power.

According to the invention, moreover, the internally toothed ratchet rings are provided rotatably only in one direction relative to the member on the driving side through one-way clutches and the pawls in one row and the other row are alternately arranged to engage with ratchets of the internally toothed ratchet rings, thereby preventing the shocks in switching the driven pawls.

In a preferred embodiment of the invention, there is provided eccentricity changing means for rotating an outer eccentric cam relative to an inner eccentric cam to change the eccentricity of the cam assembly, and the eccentricity changing means comprises worm and worm-gear means for rotatively driving the outer eccentric cam and wire means for driving a worm of the worm and worm-gear means.

With this arrangement, the eccentricity of the eccentric cam assembly is changed by rotatively driving a worm in mesh with a worm-gear geared with the outer eccentric cam, whereby a large force can be transmitted to the outer eccentric cam through the worm-gear even if the force driving the worm is small.

Moreover, as the worm is not driven by the worm-gear, if the worm-gear is subjected to reverse input force from the outer eccentric cam, the worm-gear is not rotated owing to its self-locking. Accordingly, the stepless speed change device can be held in any speed change condition according to the invention.

The stepless speed change device according to the invention can be applied not only to a rear wheel hub but also to a crankshaft for pedals in which case the rotary member on the input side is fixed to a crank arm for the pedal of a bicycle.

The invention will be more fully understood by referring to the following detailed specification and claims taken in connection with the appended drawings.

BRIEF DESCRIPTION OF THE DRAWINGS

FIG. 16 is a sectional view of the device taken along a line XVI—XVI in FIG. 15;

FIG. 17 is a sectional view of the device taken along a line XVII—XVII in FIG. 15; and FIG. 18 is a view for explaining the operation of the device shown in FIG. 16.

DESCRIPTION OF THE PREFERRED EMBODIMENTS

Figure 1:
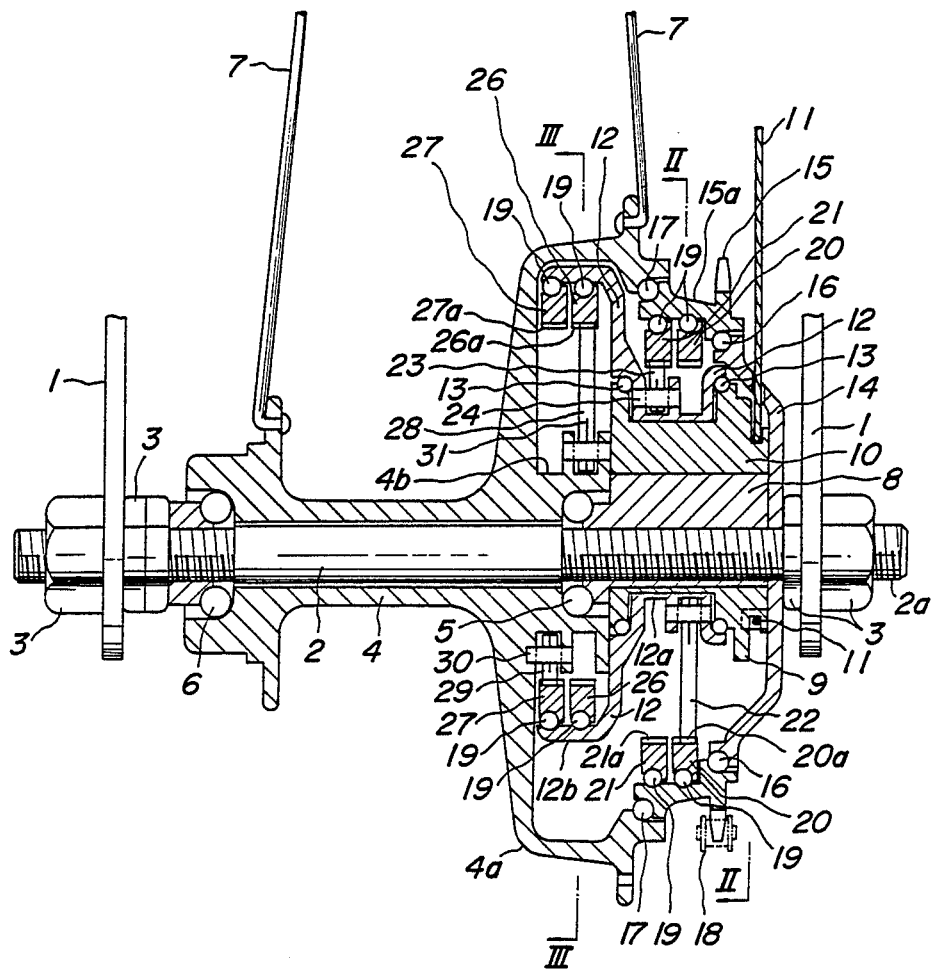
FIG. 1 is a sectional view of the device according to the invention.
Figure 2:
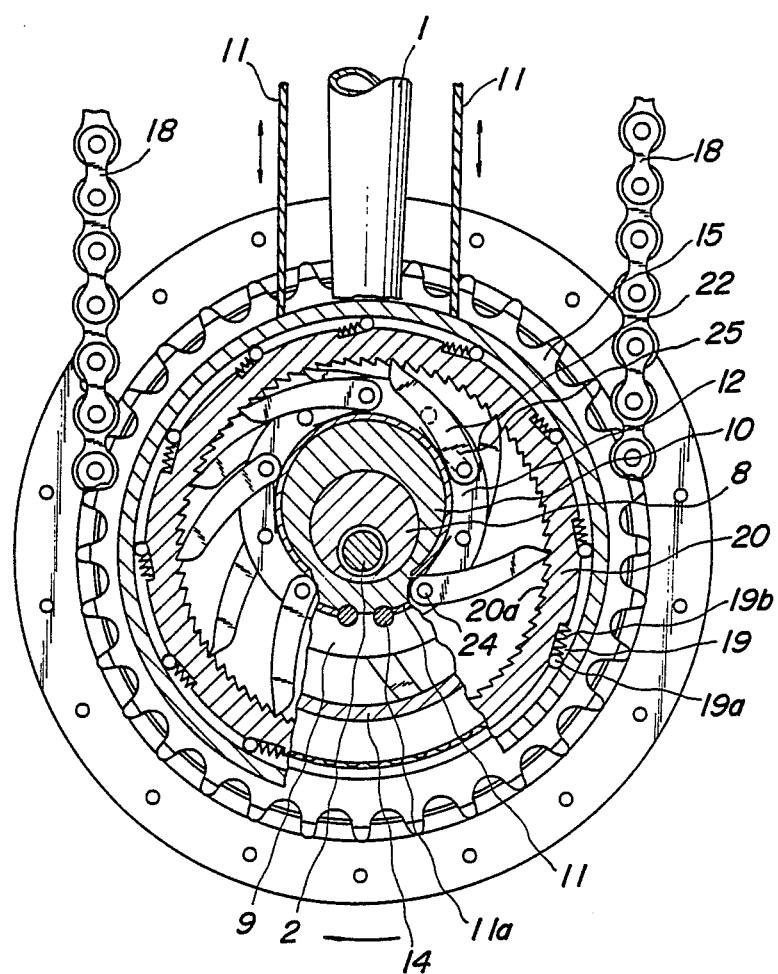
FIG. 2 is a sectional view taken along a line II—II in FIG. 1.
Figure 3:
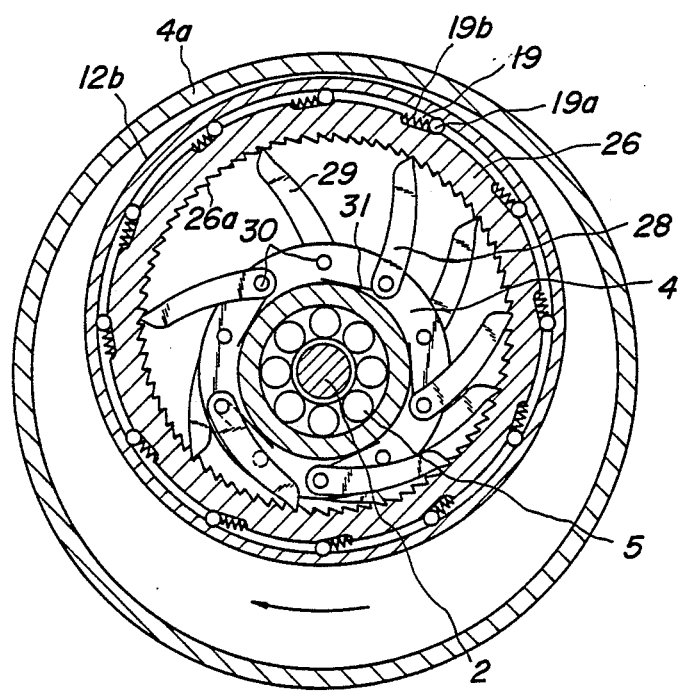
FIG. 3 is a sectional view taken along a line III—III in FIG. 1.

FIGS. 1–3 illustrating a stepless speed change device of one embodiment of the invention, with chain stays 1, a hub spindle 2 for a rear wheel fixed to the chain stays 1 by means of lock nuts, a rear wheel hub 4 rotatably mounted on the spindle 2 by means of bearings 5 and 6, and spokes 7.

In this embodiment, the spindle 2 for the rear wheel is formed with a screw-threaded portion 2a to which is fixed an inner eccentric cam 8 threadedly engaged thereon. On the inner eccentric cam 8 is rotatably fitted an outer eccentric cam 10 integrally formed with a wire reel 9 about which is wound an operating wire 11 having ends 11a (FIG. 2).

Moreover, a carrier 12 comprises a small diameter cylinder 12a and a large diameter cylinder 12b integrally formed so that the small diameter cylinder 12a is fitted on the outer eccentric cam 10 by means of bearings 13 and the large diameter cylinder 12b is arranged in a hollow cylindrical casing 4a formed integrally with the rear wheel tub 4.

A dish-shaped casing 14 is fixed to the spindle 2 by means of the inner eccentric cam 8 and the lock nut 3. A sprocket 15 for the rear wheel includes a cylindrical portion 15a integral therewith and is rotatably arranged between the casing 14 and the rear wheel hub 4 with the aid of bearings 16 and 17.

In the cylindrical portion 15a of the sprocket 15, are arranged a plurality of rows of ratchet rings 20 and 21 side by side through one-way clutches 19 of the same number as that of the rows of the ratchet rings. Although the rows of the ratchet rings are two in this embodiment, they may be three or more. The ratchet rings 20 and 21 are formed on their inner circumferences with ratchets 20a and 21a, respectively. A plurality (five in this embodiment) of pawls 22 and 23 in a plurality of rows are arranged so as to engage the ratchets 20a and 21a. Bottoms of the pawls 22 and 23 are pivotally connected to an outer circumference of the small diameter cylinder 12a of the carrier 12 by means of pins 24 such that the bottoms of the pawls 22 are positioned between the bottoms of the pawls 23 and vice versa. The one-way clutch 19 comprises balls 19a and springs 19b serving to urge the balls. The one-way clutch may be of any other type, for example, using a ratchet and pawls. Springs 25 always urge front ends of the pawls 22 and 23 against the ratchets 20a and 21a.

In the large diameter portion 12b of the carrier 12, furthermore, are arranged a plurality rows (two rows in this embodiment) of ratchet rings 26 and 27 side by side through one-way clutches 19 similar to the above mentioned one-way clutches. The ratchet rings 26 and 27 are formed on their inner circumferences with ratchets 26a and 27a. A plurality (five in this case) of pawls 28 and 29 in a plurality of rows are arranged so as to engage the ratchets 26a and 27a. Bottoms of the pawls 28 and 29 are pivotally connected to an outer circumference of a hub 4b in the casing 4a by means of pins 30 such that the bottoms of the pawls 28 are positioned between the bottoms of the pawls 29 and vice versa. Springs 31 always urge front ends of the pawls 28 and 29 against the ratchets 26a and 27a.

The operation of the device constructed as above described according to the invention will be explained hereinafter. First, a sequence of transmission will be explained in the embodiment shown in FIGS. 1–3.

When a crank gear is rotated by a crank pedal (not shown), the rotation is transmitted to the sprocket 15 by a chain 18. The rotation of the sprocket 15 is further transmitted through the one-way clutches 19 to the ratchet rings 20 and 21 and then through the pawls 22 and 23 and pins 24 to the carrier 12. The rotation of the carrier 12 causes the ratchet rings 26 and 27 to rotate, so that the rear wheel hub 4 is rotated through the pawls 28 and 29 and the pins 30.

In other words, in this device, the rotation is transmitted through the first speed change device including the pawls 22 and 23 and the second speed change device including the pawls 28 and 29.

Figure 4:
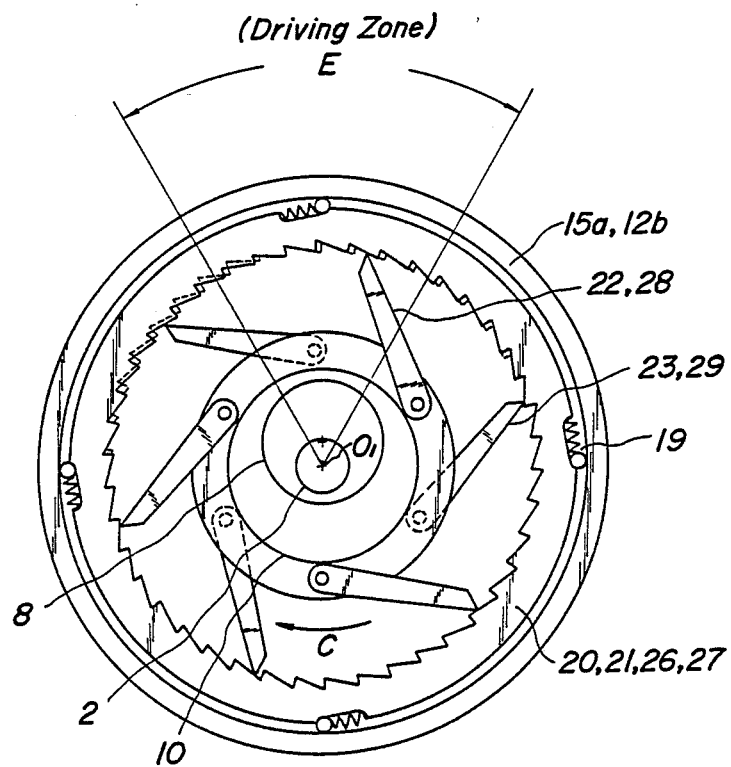
FIGS. 4 and 5 are explanatory views for explaining the operation of the device shown in FIG. 1.
Figure 5:
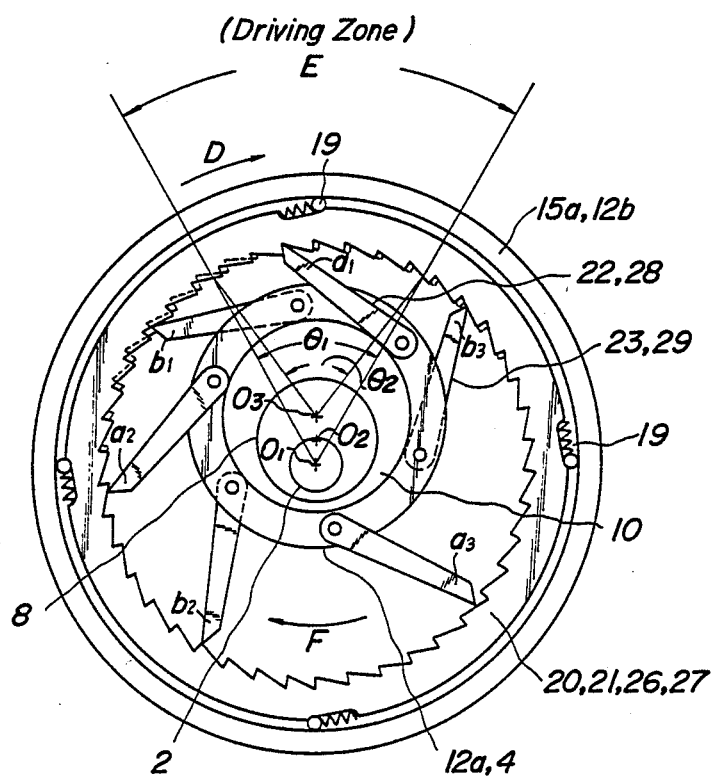

FIGS. 1 and 3 illustrate the outer eccentric cam 10 in the maximum eccentric position. When the outer eccentric cam 10 is rotated through 180° by operating the operating wire 11, an outer circumferential surface becomes concentric to the spindle 2. As FIGS. 4 and 5 is for explaining the operation of the device, the number of the pawls shown is less than that in FIGS. 1–3. Moreover, since the two sets of the speed change devices are similar in construction to each other, the same drawings will be used for explaining the operation of each. The driving rotary bodies (15a, 12b) and the ratchet rings (20, 21, 26, 27) are always concentric to the spindle 2. Therefore, with the outer eccentric cam 10 concentric to the spindle 2, when the driving rotary bodies (15a, 12b) are rotated in a direction shown by an arrow C, the respective ratchet rings and pawls are rotated in unison through the one-way clutches, so that the speed change ratio in this case is 1:1.

When the outer eccentric cam 10 is rotated by the operating wire 11 through 180° from that shown in FIG. 4 to the maximum eccentric position shown in FIG. 5, the rotation of the driving rotary bodies (15a, 12b) in a direction shown by an arrow D is transmitted through the one-way clutch 19 to the ratchet rings 20, 21, 26 and 27. The ratchet rings 20 and 26 transmit the rotation through the row a of the pawls 22 and 28 to the driven rotary bodies (12a and 4), while the ratchet rings 21 and 27 transmit the rotation through the row b of the pawls 23 and 29 to the driven rotary bodies (12a and 4).

When the outer eccentric cam 10 is eccentric, the speed-up ratio by the pawl $a_1$ positioned in the driving zone E in FIG. 5 is the largest. (As the pawls are six in number, the driving zone E is a sector having an angle of 60° which is obtained by dividing 360° by six.) Accordingly, the driven rotary bodies 12a and 4 are driven increasing its rotating speed by the pawls $a_1$. The other pawls are rotated sliding in a direction shown by F relative to the respective ratchets 20a, 21a, 26a and 27a of the ratchet rings 20, 21, 26 and 27.

When the pawls $a_1$ moves out of the driving zone E and the pawls $b_1$ enters the driving zone E, then the driven rotary bodies are driven increasing its rotating speed by the pawl $b_1$. In this manner, the pawl for transmitting the rotation progressively changes in the sequence of $a_1$, $b_1$, $a_2$, $b_2$, $a_3$ and $b_3$.

In this case, the speed change ratio (speed-up ratio) is a ratio of an angle $\theta_1$ of a driving zone of a pawl around the center $0_1$ of the spindle 2 to an angle $\theta_2$ of a driving zone of a pawl around the center $0_3$ of the outer eccentric cam 10. In the embodiment shown in FIGS. 1–3, the maximum speed-up ratio is approximately 2.15 because it is about 1.45 in the input stage and about 1.48 in the output stage.

Moreover, the speed-up ratio in the driving zone is not uniform so that pulsations occur in transmission power. In order to reduce the pulsations, smaller driving zones are better. In other words, the pulsations can be reduced by increasing the number of the pawls. According to the invention, the ratchet rings and the pawls are arranged in plural rows, so that their numbers are increased to more than twice those in single rows of the prior art. Therefore, the device according to the invention can considerably reduce the pulsations occurring in the transmission system.

In the prior art, moreover, when pawls exchange for each other in a driving zone, shocks often occur if there are clearances between front surfaces of the exchanging pawls and teeth of ratchets.

In contrast herewith, according to the invention, the occurrence of the shocks in exchanging the driven pawls can be prevented by providing the plural rows of internally toothed ratchet rings rotatable only in one direction relative to the driving members through one-way clutches and providing the plural rows of pawls so as to engage the ratchets of the ratchet rings, the pawls in one row being arranged between the pawls in the other row.

Namely, the pawl $a_1$ in the row a in the driving zone E in FIG. 5 tightly engages the ratchets to transmit the power from the driving rotary bodies 15a and 12b to the driven rotary bodies 12a and 4.

In this case, all speeds of front ends of the pawls $b_1$, $a_2$, $b_2$, $a_3$ and $b_3$ other than $a_1$ are faster than the rotating speed of the ratchet, so that the front ends of the pawls rotate slidingly in a direction shown by an arrow F. The pawl $b_1$ whose front end speed is nearest to that of the ratchet is not subjected to any load. Accordingly, the ratchet rings 21 and 27 in the row b can be rotated faster than the ratchet rings of the row a by the friction movement of the pawls in the row be in the clockwise direction as viewed in the drawing devoid of the action of the one-way clutches 19.

In other words, the power for rotating the ratchet rings 21 and 27 in the rows b faster than those in the rows a is caused by the drag of the pawls $b_2$ and $b_3$ of the row b with faster speed of the front ends of the pawls. The pawls $b_1$ which are slowest among pawls in the rows b have tightly engaged with ratchets 21a and 27a in the rows b before the pawls $b_1$ enter the driving zone E, so that the pawls $b_1$ in the rows b receive the rotation of the driving rotary bodies 15a and 12b without shocks occurring when exchanging of the pawls. In this manner, the pawls in rows a and b are relayed alternately to obtain the smooth rotation of the wheel.

According to the invention, the ratchet rings and the pawls are provided in the rows to increase the number of the pawls greatly, thereby considerably deceasing pulsations in the transmission of power.

According to the invention, moreover, the internally toothed ratchet rings in plural rows are arranged rotatably only in one direction relative to the driving members through the respective one-way clutches and the pawls in plural rows are arranged alternately so as to engage ratchets of the internally toothed ratchet rings, so that the shocks caused in exchanging the driven pawls are prevented. Accordingly, the device of the invention rotates smoothly with less pulsation and less shock.

Figure 6:
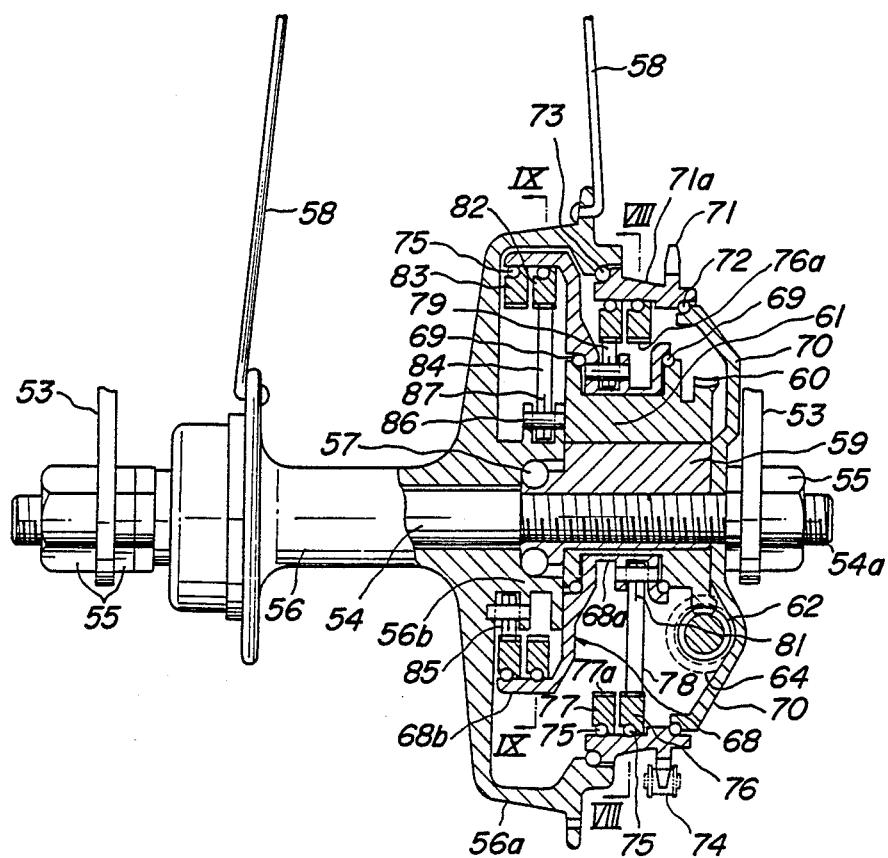
FIG. 6 is a sectional view of the device of another embodiment of the invention having worm and worm-gear means.
Figure 7:
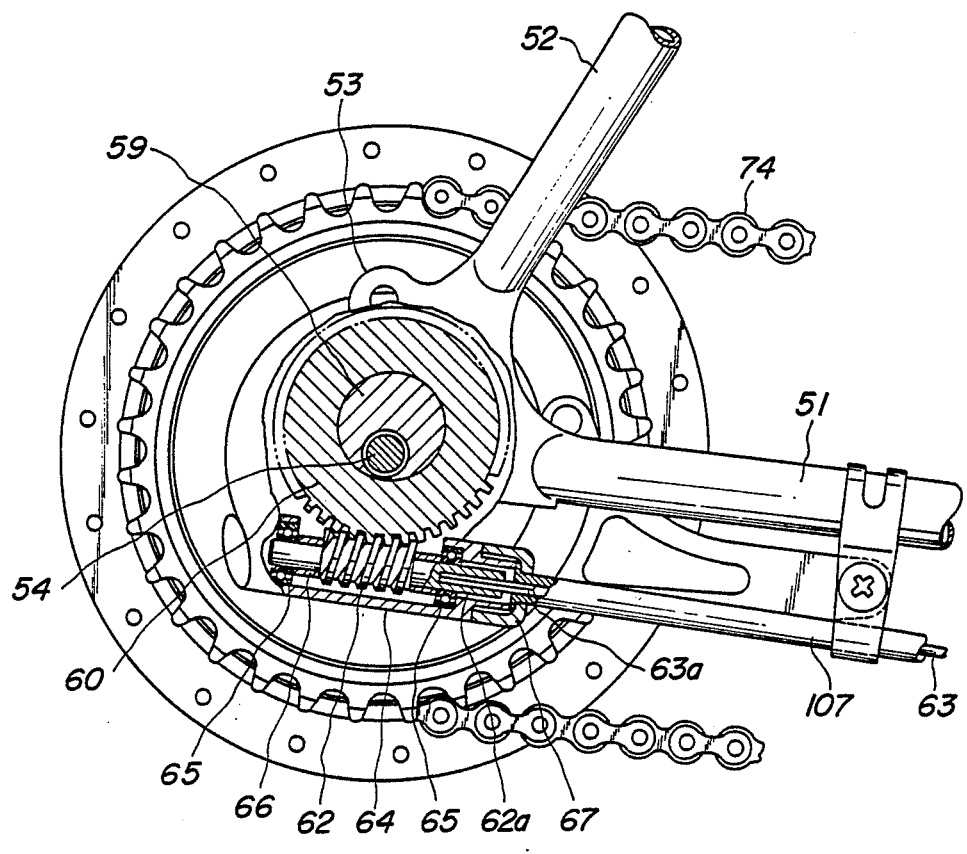
FIG. 7 is a side view illustrating in section one part of the device shown in FIG. 6.

FIGS. 6 and 7 illustrate another embodiment of the invention which uses a worm and worm-gear mechanism for changing the eccentricity of the outer eccentric cam instead of the operating wire.

The device shown in FIGS. 6 and 7 is similar to that of FIGS. 1 and 2 with exception of the worm and worm-gear mechanism. The same parts will not be described in further detail. An outer eccentric cam 61 is formed with a worm-gear 60 which engages a worm 62. The worm 62 includes a shaft 62a whose one end grasps a square end of an inner wire 63 in an outer wire 107. The shaft 62a is journaled in bearings 65 and rotatable relative to a casing 64. Collars 16 are on the shaft 62a of the worm 62 and interposed between the worm 62 and the bearings 65. A numeral 67 denotes a cap.

When the inner wire 63 is rotated, the worm 62 rotates the worm-gear 60 to cause the outer eccentric cam 11 to rotate. In this manner, the eccentricity of the outer eccentric cam 11 can be changed.

Figure 8:
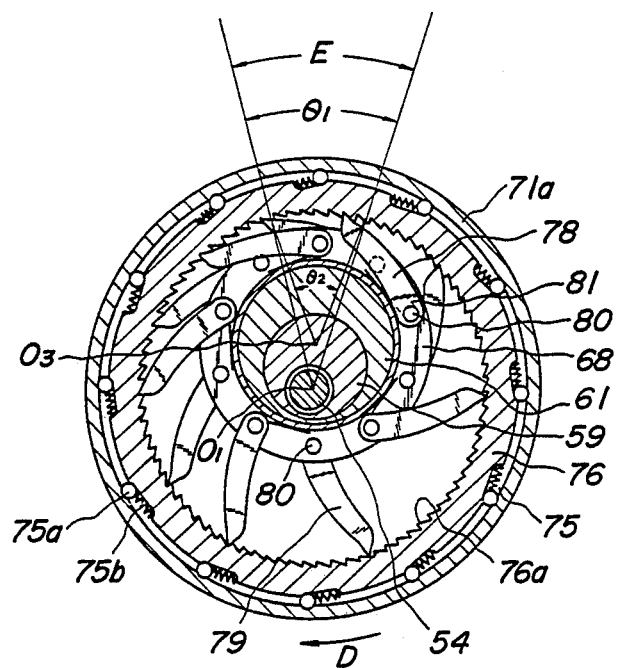
FIG. 8 is a sectional view taken along a line VIII—VIII in FIG. 6.
Figure 9:
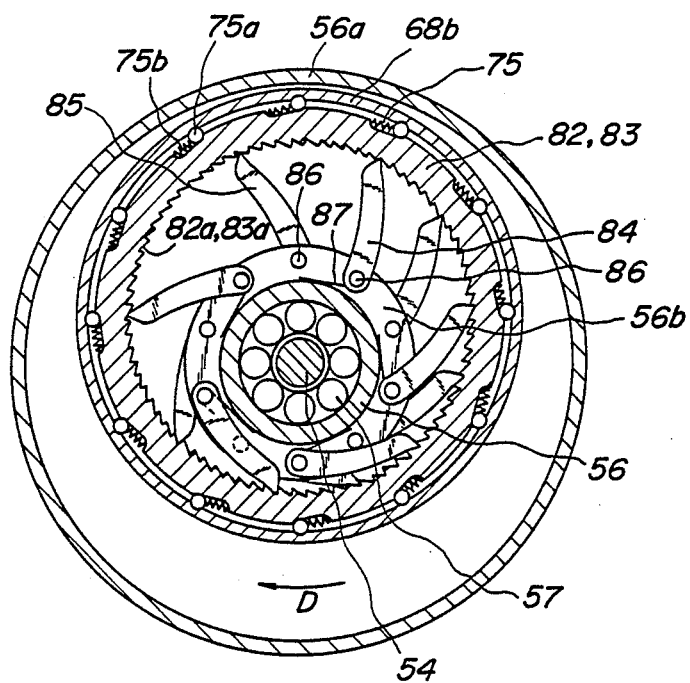
FIG. 9 is a sectional view taken along a line IX—IX in FIG. 6.

The feature shown in FIG. 9 is substantially identical with that shown in FIG. 3 with exception of the pawls 78 and 79. In FIGS. 8 and 9, the pawls are ten, so that the driving zone E is a sector having an angle of 36°.

Figure 10:
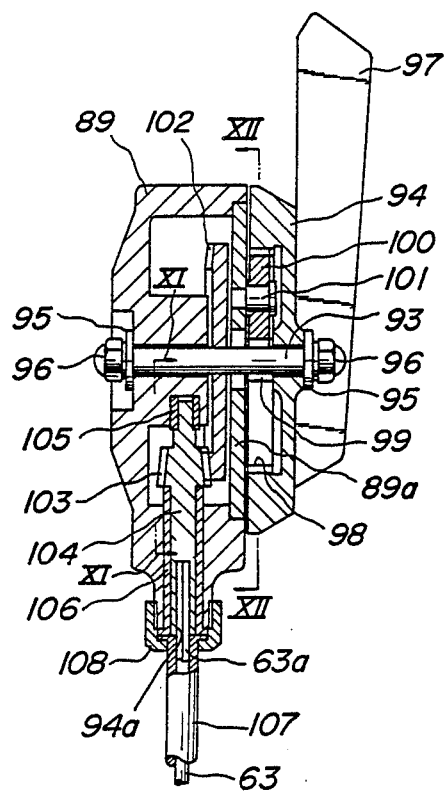
FIG. 10 is a sectional view illustrating one example of an input portion for operating the worm and worm-gear means in FIG. 6.
Figure 11:
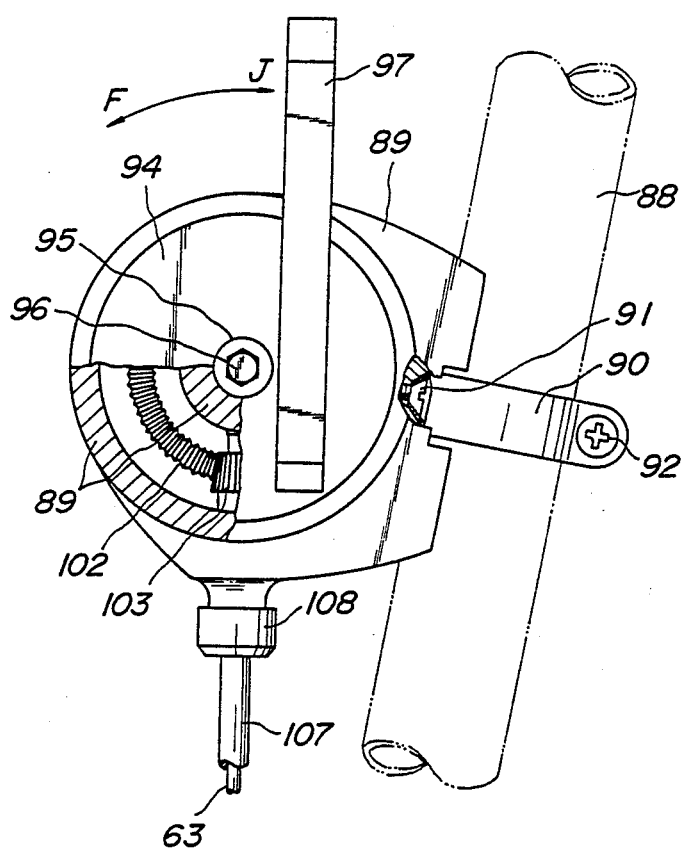
FIG. 11 is a side view of a part of the device shown in FIG. 10 as viewed in a direcion shown by arrows XI—XI.
Figure 12:
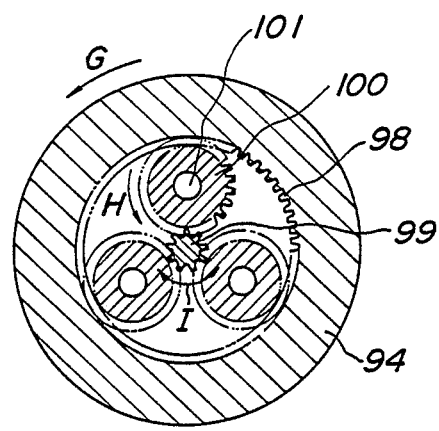
FIG. 12 is a view of the device taken along line XII—XII in FIG. 10.

FIGS. 10–12 illustrate one example of the operating input portion suitable for the speed change operating device for use in the stepless speed change device according to the invention.

A casing 89 for the speed change operating device is fixed to a frame tube 88 by means of a band 90. The band 90 is fixed to the casing 89 by a set screw 91 and clamps the frame tube 88 with the aid of a screw 92.

The casing 89 is substantially of a disc through which a main shaft 93 passes through at its center. A lever body 94 in the form of a disc is provided rotatably about the main shaft 93 on one side of the casing 89. Reference numerals 95 denote washers fitted on extending ends of the main shaft 93 and clamped by nuts 96.

The lever body 94 is integrally formed with a lever 97 and is formed in its inner surface with an internal gears 98. The main shaft 93 is integrally formed with a sun gear 99. Planet gears 100 are journaled on pins 101 on a wall plate 89a of the casing 89 so as to engage the sun gear 99 and the internal gear 98. These internal gear 98, the planet gears 100 and the sun gear 99 form a first speed-up mechanism.

To the main shaft 93 in the casing 89 is fixed a large diameter bevel gear 102 adapted to engage a small diameter bevel gear 103 rotatably journaled in the casing 89 through a shaft 104, having bearing bushes 105 and 106. The large diameter and small diameter bevel gears 102 and 103 form a second speed-up mechanism.

The shaft 104 has an outer extending end which is formed with a square aperture 104a for receiving therein the square end 63a of the inner wire 63. One end of the outer wire 107 for the inner wire 63 is fixed to the casing 89 by means of a cap 108.

The operation of the speed change operating device constructed as above described will be explained hereinafter.

Referring to FIG. 11, when the lever 97 is rotated in a direction shown by an arrow F, the lever body 94 is rotated in a direction shown by the arrow G as shown in FIG. 12, with the result that the planet gears 100 are rotated in directions shown by an arrow H to cause the sun gear 99 rotate in speed-up or with an increased rotative ratio in a direction shown by an arrow I. In this case, the speed-up ratio or gear ratio is determined by the numbers of teeth of the internal gear 48 and the sun gear 49. With this embodiment, the speed-up ratio is about 6.7.

When the sun gear 99 or the main shaft 93 integral therewith is rotated, the large diameter bevel gear 102 fixed to the main shaft 93 is rotated together with the sun gear 99 in unison, so that the small bevel gear 103 in mesh with the large diameter bevel gear 102 is rotated in speed-up. In this embodiment, the speed-up ratio is about 4. In these first and second speed-up mechanisms, therefore, a speed-up ratio of about 27 is obtained as a whole. The rotation of the increased speed is transmitted through the inner wire 63 to the worm 62 shown in FIGS. 6 and 7, so that the outer eccentric cam 61 is rotated relative to the inner eccentric cam 59 by the worm gear 60 to change the eccentricity of the entire cam assembly.

If the lever 97 shown in FIG. 6 is rotated in a direction shown by an arrow J opposite to the direction F, the operation above described is effected in a reverse direction to return to the eccentric cam assembly to the original position.

Figure 13:
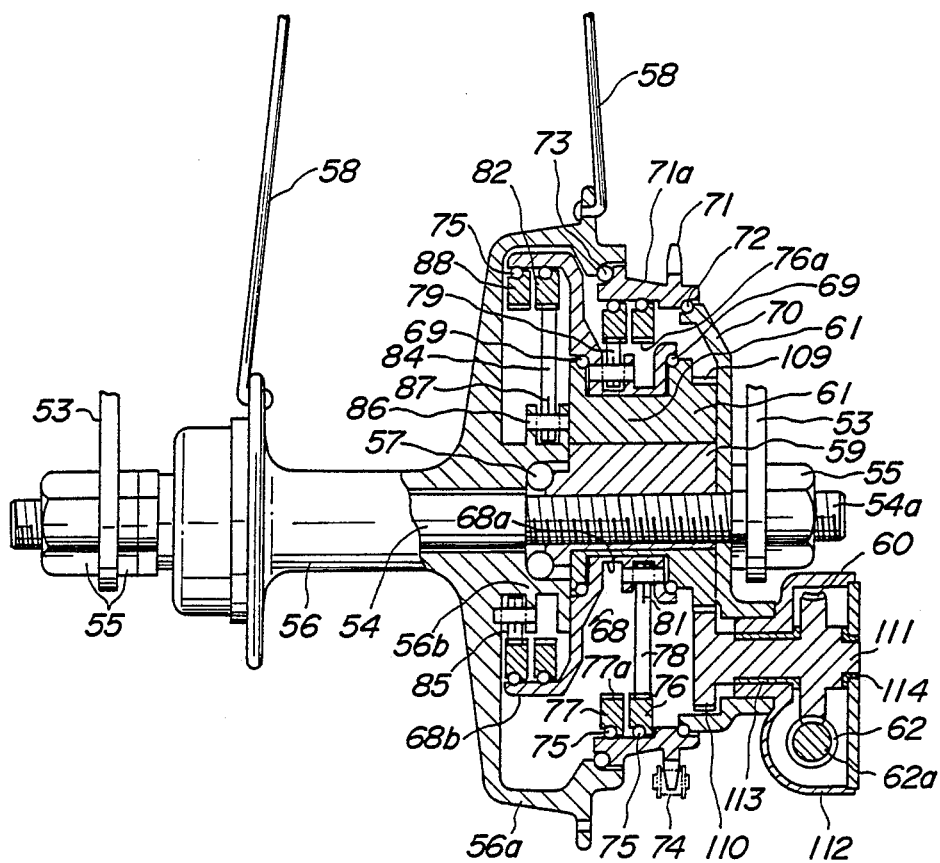
FIG. 13 is a sectional view of a further embodiment of the device according to the invention.
Figure 14:
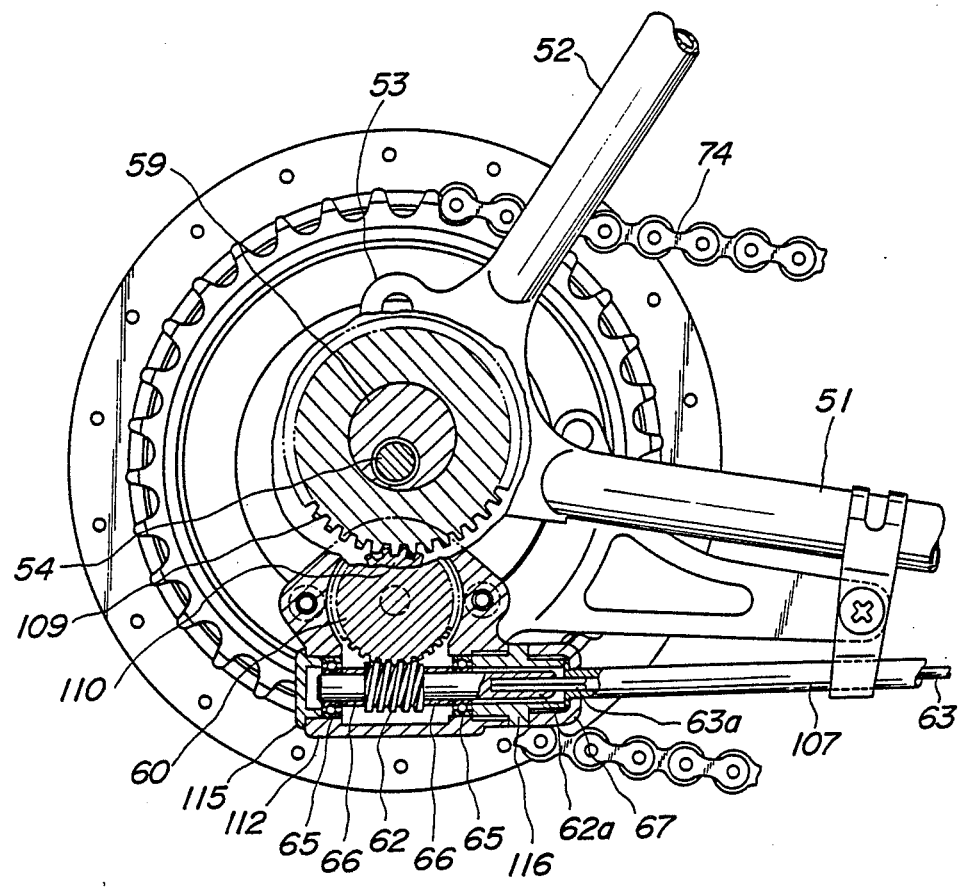
FIG. 14 is a side view illustrating in section one part of the device shown in FIG. 13.

FIGS. 13 and 14 illustrate a further embodiment modified from the embodiment shown in FIGS. 6 and 7, wherein like components have been designated by the same reference numerals used in FIGS. 6 and 7.

Only different components from those in the previous embodiment will be explained. An outer eccentric cam 61 is formed integrally with a gear 109 in mesh with a gear 110 whose shaft 111 is rotatably journaled by bushings 113 and 114 in a gear box 112 connected to a casing 70. The shaft 111 is formed integrally with a worm-gear 60 in mesh with a worm 62 whose shaft 62a is rotatably journaled in the gear box 112. The gear box 112 has a cap 115 fitted on its one end and a sleeve-like coupling 116 threadedly engaged the other end of the gear box 112. The other construction is similar to those of the embodiment in FIGS. 6 and 7.

In this embodiment, when an inner wire 63 is rotated with an increased rotative speed, the worm 62 and the worm-gear 60 are rotated, thereby rotating the outer eccentric cam 61 through the shaft 111 and gears 60 and 109. The further operation is similar to that of the device shown in FIGS. 6 and 7 and will not be described in further detail. According to these embodiments, the worm-gear 60 geared with the outer eccentric cam 61 is provided and the worm 62 in mesh with the worm-gear 60 is rotated to effect the speed change. Even if the turning force at the worm 62 is small, a large force can be transmitted through the worm-gear 110 to the outer eccentric cam 110. Accordingly, there is an advantage in that the operating force for the device can be reduced.

The worm-gear 60 is driven by the worm 62 but the worm 62 cannot be driven by the worm-gear 60. Therefore, the worm-gear 60 is always under a self-lock condition. Even if the worm-gear 60 is subjected to a reverse input force from the outer eccentric cam 61, the worm-gear 60 is not rotated because of the self-locking. According to these embodiments, therefore, the stepless speed change device has the superior performance capable of securely holding the stepless speed change mechanism in any speed changing condition.

Figure 15:
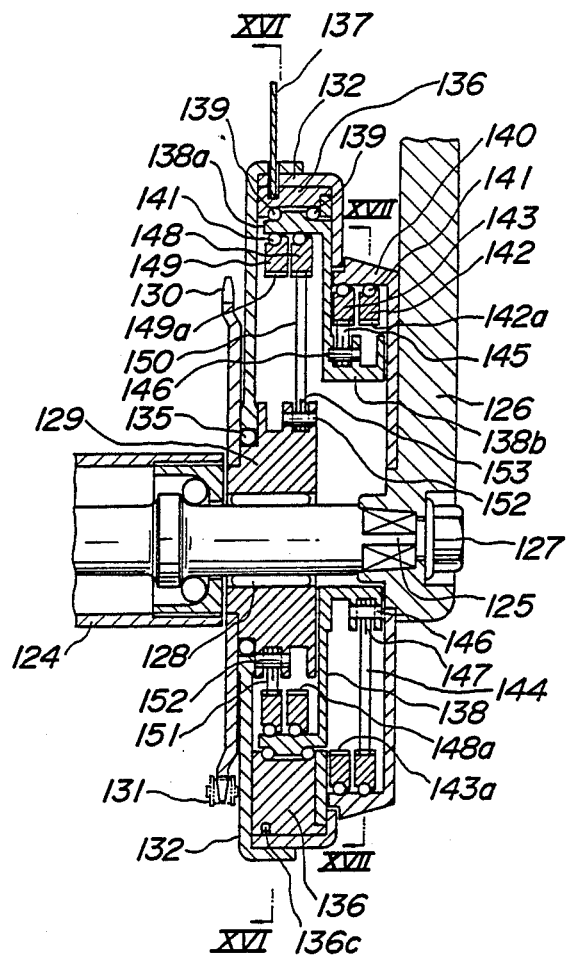
FIG. 15 is a sectional view of the device according to the invention applied to a crankshaft for pedals for a bicycle.

FIGS. 15 and 16 illustrate a further embodiment of the invention, wherein a stepless speed change device is applied onto a crankshaft for pedals and has a modified eccentric cam assembly.

The drawings illustrate a main tube 121 (FIG. 16) of a bicycle frame, a down tube 122 a chain stay 123, a hanger lug 124 (FIG. 15), a crankshaft 125 rotatable relative to the hanger lug 124 and a crank arm 126 fixed to the crankshaft 125 by a lock nut 127.

In this embodiment, a crank gear 130 is fixed to an output-side rotary member 129 which is fitted through bearings 128 on the crankshaft 125. Reference numeral 131 denotes a chain.

A stationary casing 132 is in the form of a hollow disc whose center $O_2$ is eccentric to the center $O_1$ by $l_1$ and is fixed to the chain stay 123 by means of a bracket 133 with the aid of bolts 134 or the like. Ball bearings 135 are interposed between the stationary casing 132 and the output-side rotary member 129 (FIG. 15).

In the stationary casing 132 is rotatably arranged an annular carrier frame 136 having inner circular hole 136b which is eccentric by $l_2$ ($l_2=l_1$) to a center $O_2$ of a circular outer circumferential surface 136a. An operating wire 137 is wound in a groove 136c formed in the outer circumferential surface of the carrier frame 136 for rotating the carrier frame 136 through about 120°. The operating wire 137 has wire ends 137a for fixing the ends and extends out of an aperture 132a formed in the stationary casing 132. When the operating wire 17 is moved by an operating mechanism (not shown), the carrier frame 136 is reciprocatively rotated through about 120°.

A large diameter cylinder 138a of the carrier 138 having a small diameter cylinder 138b integrally formed with and concentric to the large diameter cylinder 138a is rotatably fitted through ball bearings 139 in the carrier frame 136. As explained latter, in this embodiment, the annular carrier frame 136 and the carrier 138 form an eccentric cam assembly corresponding to the inner and outer cams 8 and 10 in FIG. 1. The small diameter cylinder 138b of the carrier 138 is enclosed by an input-side rotary member 140 in the form of a frying pan which is concentric to and fixed to the crankshaft 125 through the crank arm 126. Internally teethed ratchet rings 142 and 143 in plural rows are arranged side by side in the input-side rotary member 140. Two rows of the rings are provided in this embodiment, however, three or more rows may be provided. These ratchet rings 142 and 143 are formed in their inner surfaces with ratchets 22a and 23a. A plurality of pawls 144 and 145 in plural rows engage the ratchets 142a and 143a. In this embodiment, five pawls are in one row. Bottoms of the pawls 144 and 145 are pivotally connected to an outer circumference of the small diameter cylinder 138b of the carrier 138 by means of pins 146 such that the bottoms of the pawls 144 are positioned between the bottoms of the pawls 145 and vice versa. The one-way clutch 141 comprises balls 141a and springs 141b serving to urge the balls. The one-way clutch may be of any other type, for example, using a ratchet and pawls. Springs 147 always urge front ends of the pawls 144 and 145 against the ratchets 142a and 143a.

In the large diameter portion 138a of the carrier 138, furthermore, are arranged a plurality rows (two rows in this embodiment) of ratchet rings 148 and 149 side by side through one-way clutches 141 similar to the above mentioned clutches. The ratchet rings 148 and 149 are formed on their inner circumferences with ratches 148a and 149a. A plurality (five in this case) of pawls 150 and 151 in a plurality of rows are arranged so as to engage the ratchets 148a and 149a. Bottoms of the pawls 150 and 151 are pivotally connected to an outer circumference of the output-side rotary member 9 integral with the crank gear 130 by means of pins 152 such that the bottoms of the pawls 150 are positioned between the bottoms of the pawls 151 and vice versa. Springs 153 always urge front end of the pawls 150 and 151 against the ratchets 148a and 149a.

In operation, when the crank arms 126 are rotated by crank pedals (not shown), the rotation of the crank arms is transmitted to the input rotary member 140. Moreover, the rotation of the input rotary member 140 is transmitted through one way-clutches 141 to the internally toothed ratchet rings 142 and 143 and further through the ratchets 142a and 143a, pawls 144 and 145 and the pins 146 to the carrier 138. When the carrier 138 is rotated, the internally toothed ratchet rings 148 and 149 are rotated through the one way clutches 141, with the result that the output-side rotary member 129 and the crank gear 130 are rotated.

In this embodiment, therefore, the rotation is transmitted through two sets of speed change devices, that is, the first speed change device having the pawls 144 and 145 and the second speed change device having the pawls 150 and 151.

The eccentric cam assembly in this embodiment comprises the annular carrier frame 136 and the carrier 138 as above described.

The carrier 138 in FIGS. 15, 16 and 17 is under the maximum eccentric condition with the aid of the carrier frame 136. When the carrier frame 136 is rotated through 120° from the condition shown in FIG. 16 to that of FIG. 18, the center $O_3$ of the carrier 138 is concentric to the center $O_1$ of the crank shaft 125. When the operating wire 137 is actuated, the annular carrier frame 136 is moved so that the carrier 138 is moved relative to the output-side rotary member 129, thereby changing the eccentricity of the eccentric cam assembly consisting of the annular carrier frame 136 and the carrier 138. The further operation of the device is quite the same as that explained with reference to FIGS. 4 and 5.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A stepless speed change device comprising: first internally toothed ratchet rings arranged in plural rows side by side in an axial direction on an inner circumferential surface of a rotary member on an input side through one-way clutches interposed therebetween; an eccentric cam assembly whose eccentricity is adjustable; first pawls in plural rows to engage first ratchets provided in said first ratchet rings and having bottoms pivotally connected to a carrier rotatably in contact with said eccentric cam assembly, said bottoms of the first pawls in one row being between said bottoms of the first pawls in another of said plural rows; second internally toothed ratchet rings arranged in plural rows side by side in the axial direction on an inner circumferential surface of an annular portion formed integrally with said carrier through one-way clutches interposed therebetween; second pawls in plural rows to engage ratchets provided in said second ratchet rings and having bottoms pivotally connected to a rotary member on an output side, said bottoms of the second pawls in one row being between said bottoms of the second pawls in another of said plural rows.

2. A device as set forth in claim 1, wherein said eccentric cam assembly comprises of an inner eccentric cam substantially in the form of a cylinder eccentrically fixed to a center shaft, an outer eccentric cam substantially in the form of a cylinder snugly rotatably fitted on said inner eccentric cam, and eccentricity changing means for rotating said outer eccentric cam relative to said inner eccentric cam to change the eccentricity of the cam assembly.

3. A device as set forth in claim 2, wherein said eccentricity changing means comprises an operating wire extending about said outer eccentric cam, the outer eccentric cam being rotatable by operating the operating wire to change the eccentricity.

4. A device as set forth in claim 2, wherein said eccentricity changing means comprises worm and worm-gear means for rotatively driving said outer eccentric cam and wire means for driving a worm of said worm and worm-gear means.

5. A device as set forth in claim 4, wherein said worm and worm-gear means comprises a worm-gear formed circumferentially on said outer eccentric cam and a worm in mesh with said worm-gear and supported by a casing fixed to said inner eccentric cam.

6. A device as set forth in claim 4, wherein said worm and worm-gear means is supported on a casing fixed to the inner eccentric cam, said outer eccentric cam being drivable by gear means between said outer eccentric cam and the worm and worm-gear means.

7. A device as set forth in claim 4, wherein said wire means is provided with manual operating means which comprises a small bevel gear connected to a wire of the wire means, a large bevel gear in mesh with the small bevel gear and rotatable together with a main shaft, planetary gear means having a sun gear rotatable together with said main shaft, and a lever for manually rotatively driving a carrier of said planetary gear means.

8. A device as set forth in claim 1, wherein said annular portion of the carrier is rotatably arranged in an inner circular hole of an annular carrier frame, said inner circular hole being eccentric to a center of the device to form said eccentric cam assembly consisting of said carrier and said annular carrier frame, an eccentricity of the cam assembly being adjustable by rotating said annular carrier frame.

9. A device as set forth in claim 8, wherein, an operating wire extending about said annular carrier frame is provided for changing the eccentricity of the cam assembly by operation the operating wire.

10. A device as set forth in claim 8, wherein, ball bearings are arranged between the annular carrier frame and said carrier.

11. A device as set forth in claim 1, further including a crank arm of a pedal of a bicycle, said rotary member on the input side being fixed to said crank arm.

* * * * *